United States Patent [19]

Bassignani

[11] 4,071,171
[45] Jan. 31, 1978

[54] MATERIAL MEASURING AND DISPENSING DEVICE

[76] Inventor: Anthony L. Bassignani, 17 King St., Norfolk, Mass. 02056

[21] Appl. No.: 761,894

[22] Filed: Jan. 24, 1977

Related U.S. Application Data

[63] Continuation-in-part of Ser. No. 614,702, Sept. 18, 1975, Pat. No. 4,006,842.

[51] Int. Cl.² .............................................. G01F 11/10
[52] U.S. Cl. ..................................... 222/305; 222/439
[58] Field of Search ............... 222/438, 439, 440, 305, 222/284

[56] References Cited

U.S. PATENT DOCUMENTS

| | | |
|---|---|---|
| 3,179,303 | 4/1965 | Dankoff et al. ........................ 222/438 |
| 3,207,371 | 9/1965 | Stone ..................................... 222/439 |
| 3,341,088 | 9/1967 | Moynihan ............................. 222/440 |

Primary Examiner—Stanley H. Tollberg
Attorney, Agent, or Firm—Edgar H. Kent

[57] ABSTRACT

A granular material dispenser is provided preferably as a closure member for a container of the material, which comprises a variable capacity dispensing mechanism, with operating mechanism therefor oppositely pivotable about an axis to alternately close the outlet end of the dispensing mechanism and thereafter open its inlet end to the container, and to close the inlet end and thereafter open the outlet end, and adjustment mechanism for varying the capacity of the dispensing mechanism and visually indicating its adjusted capacity. In the illustrated embodiment, the dispensing mechanism is a single, variable capacity compartment in fixed location relative to the container, and barrier members are reciprocally movable about an axis to open and close its ends.

11 Claims, 10 Drawing Figures

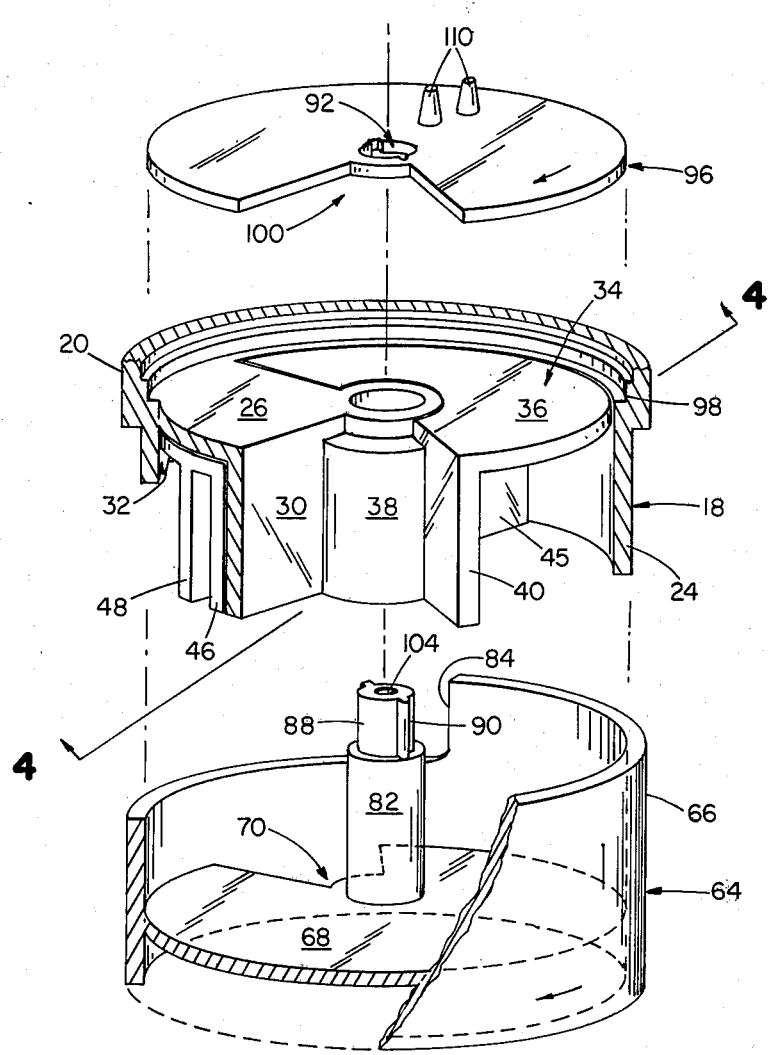

MATERIAL MEASURING AND DISPENSING DEVICE

CROSS-REFERENCE TO RELATED APPLICATION

This application is a continuation-in-part of my U.S. patent application Ser. No. 614,702, filed Sept. 18, 1975 now U.S. Pat. No. 4,006,842, issued Feb. 8, 1977.

BACKGROUND OF THE INVENTION

1. Field of the Invention

This invention relates to devices for measuring and dispensing granular materials. Particularly, the invention relates to such devices which are suitable for hand-held dispensing and which are provided with means for adjustably varying the quantity dispensed.

2. Description of the Prior Art

Prior art devices of the type concerned have utilized a multi-compartment measuring chamber which is reciprocated between fill and dispense positions, with adjustment means which selects the numbers of compartments to be filled. Advantageously, in hand-held units, the multi-compartment measuring chamber is reciprocated about an axis, as in U.S. Pat. No. 2,002,039.

My aforesaid patent application discloses an improvement over U.S. Pat. No. 2,002,039 wherein a multi-compartment measuring chamber is fixed at the outlet from the material container, filling and dispensing is accomplished by reciprocating closure members across the tops and bottoms of the compartments about an axis, and selection of the number of compartments to be filled and dispensed is effected by controlling the extent of movement of the closure members. Advantages of this construction over that of U.S. Pat. No. 2,002,039 include no movement of the filled compartments for dispensing, reduction of material dusting and consequent jamming, and ease of operation. However, the construction of the patent application, like that of the patent, has a disadvantage when it is desired to provide numerous adjustments of dispensed quantities varying in small increments, since the minimum cross-section of such compartments which will fill and dispense satisfactorily restricts adjustment increments to minimum quantities which may be too high, and the minimum thickness of the individual compartment walls, added to the minimum cross-section of the compartments, limits the number of compartments which can be provided, due to space considerations.

U.S. Pat. No. 1,090,764 discloses a dispenser construction in which a single compartment fixed at the container outlet is adjustable in size by a movable block, and is dispensed by reciprocating closure members with respect to the compartment. While the structure of this patent does not have the aforesaid disadvantage, its reciprocation and adjustment arrangements are not at all suitable for a hand-held dispenser.

SUMMARY OF THE INVENTION

An object of the invention is to provide a dispenser of the type concerned which is similar to that disclosed in my aforesaid patent application, but with a single measuring compartment fixed at the container outlet, and means for adjusting its capacity and visually indicating its adjusted capacity.

Another object is to provide a dispenser in which dispensing means, dispense volume adjusting means and adjusted volume indicating means are incorporated in a closure member for a container of the granular material suitable for handholding, the dispense means being operable by hand-rotation of a portion thereof partially about an axis.

In one aspect, the invention features a dispenser having an open-ended measuring compartment fixed at the outlet from a container to receive material therefrom; barrier members reciprocally movable about an axis across the open ends of the compartment so that on movement thereof in one direction one of the members closes the end of the compartment nearest the container and the other member thereafter opens the other end of the compartment for dispensing, while on movement thereof in the opposite direction the last-mentioned member closes its end of the compartment before the first-mentioned member opens its end of the compartment for filling; and means are provided for adjustably varying the volume of the compartment and for visually indicating the adjusted volume thereof.

In another aspect, the invention features a dispensing closure member for a container of granular material suitable for holding in one hand, the closure member containing: dispensing means having operating means pivotable about an axis by one hand between fill and dispense positions of the dispensing means; means for adjustably varying the volume of the dispensing means; and means for indicating the volumes of material dispensed at the respective adjusted volumes of the dispensing means.

A preferred embodiment utilizes both these features in that all mechanisms are contained in an end closure member for a container for the granular material that is attachable to and detachable from the container; the dispensing means has a single open-ended compartment fixed at an outlet thereto from the container; the operating means for the dispensing means includes barrier members oppositely pivotable about the common longitudinal axis of the container and closure member to close and open the ends of the compartment for filling and dispensing in the manner previously described; the adjustment means for adjustably varying the volume of the dispensing means enlarges or restricts the volume or capacity of the dispensing compartment; and an indicating means shows on a scale exterior to the closure member the amount of material to be dispensed at each adjusted volume of the dispensing means compartment.

In the preferred embodiment, also, the adjustment means is pivotable about the longitudinal axis of the device; operation of the dispensing means between fill and dispense positions requires less than 180° pivoting of the operating means; and the operating mechanisms in the cover member are formed of molded plastic parts which are easily assembled in manufacture and disassembled and reassembled for cleaning.

The preferred device is easily operated by adjusting the dispensing compartment volume as desired and the barrier members to fill position while the device is upright (e.g., with the container base resting on a table), inverting the device with one hand grasping the container and the other hand grasping the operating means for the barrier members and, with a single twist motion between the two hands, relatively rotating the container and the operating means to pivot the barrier members about the axis from fill to dispense positions. I have found that providing less than 180° pivot motion between fill and dispense positions is important to ease to operation, since 180° pivot is too much for most persons to accomplish with a single twist. The device can be made at low cost, in small sizes and with small adjustment increments of dispensing compartment volume.

Normally, containers are provided for use with the closure members. However, since all the mechanism is contained in the closure member, it can be used with any container which it is made or adapted to fit.

BRIEF DESCRIPTION OF THE DRAWINGS

In the accompanying drawings:

FIG. 3 is a view similar to FIG. 2 of parts shown in FIG. 2 in a different relative position;

FIG. 4 is a vertical cross-section view of the parts shown in FIG. 3 assembled, taken on line 4—4 of FIG. 3 looking in the direction of the arrows.

FIG. 7 is a vertical cross-section view of the lower portion of the device as shown in FIG. 1a;

DESCRIPTION OF THE PREFERRED EMBODIMENT

Figure 1:
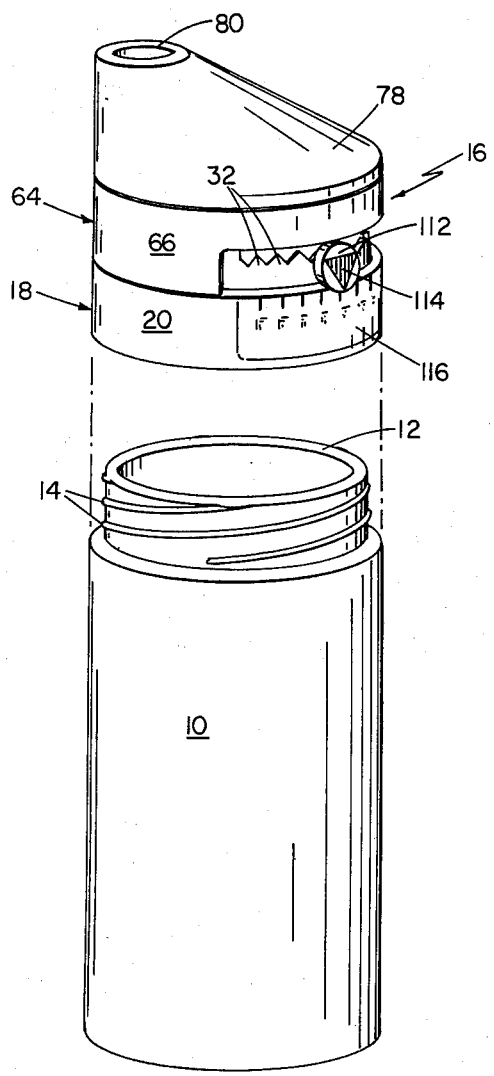
FIG. 1 is a side elevation view of a preferred embodiment, with the closure member separated from the container and the device in upright, non-use position.
Figure 1A:
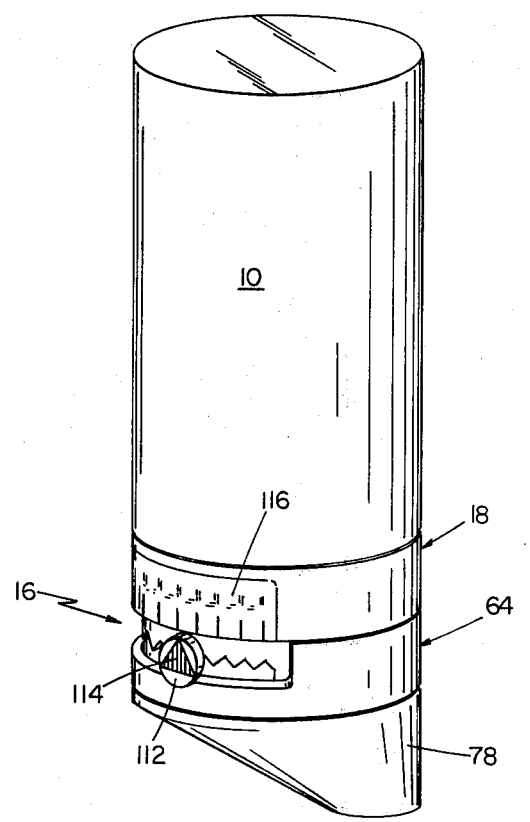
FIG. 1a is a view similar to FIG. 1 of the device of FIG. 1 with the cover member attached to the container and in the inverted, use position.
Figure 2:
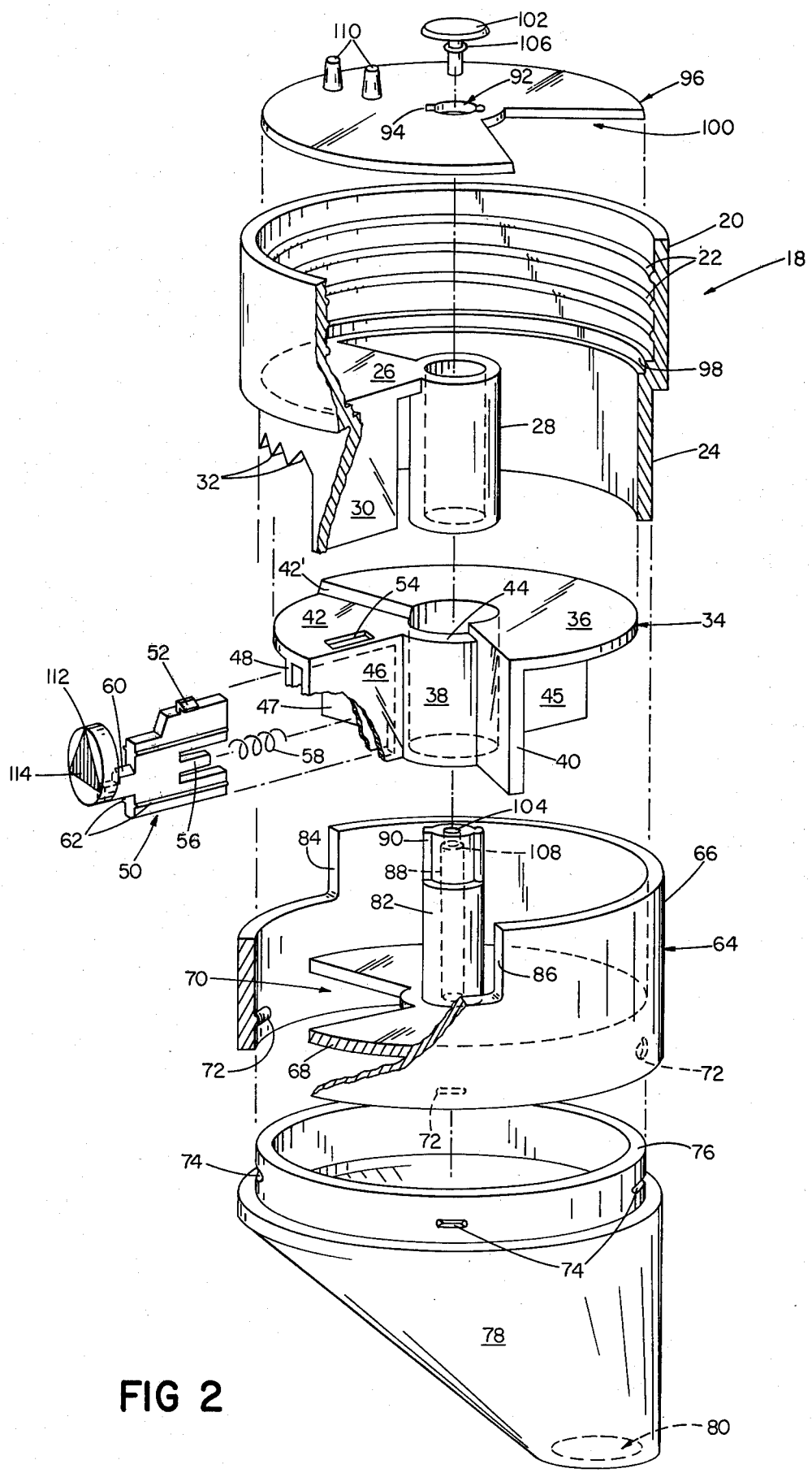
FIG. 2 is an exploded, perspective view of the parts of the cover member in the position of FIG. 1a, broken away in part to show interior construction.

Referring first to FIGS. 1, 1a and 2, the preferred embodiment shown has a container 10, which may be cylindrical as shown, and is of size to be readily grasped and held in one hand (e.g., a cylinder of the order of 3–4 inches in diameter or less). Container 10 is provided with a reduced extension 12 at one end, the top end when the device is in the upright position shown in FIG. 1, the interior of which provides an opening into the container for filling it with the material to be dispensed and for discharging the material therefrom for dispensing. Extension 12 is provided with means for attaching a closure member thereto, which, as shown, is an external screw thread groove 14.

The closure member assembly designated generally 16 has a fixed member designated generally 18, which is fixed in the sense that it is fixedly attached to container 10. Member 18 is of hollow cylindrical form with an end portion 20 which is of a diameter to fit over extension 12 and has on its inner surface a screw thread rib 22 which mates thread groove 12 to attach member 18 and the closure assembly 16 fixedly to container 10. End portion 20 has a reduced diameter portion 24, the inner surface of which closely surrounds part of the relatively pivotable assembly hereinafter described. Portion 24 is provided with a flat internal projection 26 which supports a hollow stub shaft 28 located coaxially with the common axis of the container and closure member when these parts are assembled. Extension 26 has a depending wall 30 which forms one wall of the dispensing compartment when the closure member parts are assembled as hereinafter described, so that the dispensing compartment is fixed relative to the container when the closure member is attached thereto. Portion 24 is cut away beneath projection 26, the upper edge of the cutaway portion being provided with ratchet teeth 32 which cooperate with a pawl on the dispensing volume adjustment member hereinafter described.

A dispensing compartment volume or capacity adjusting member designated generally 34 has a partially circular disc-like top 36 which fits rotatably within the inner wall of extension 24 of member 18, and a central hollow stub shaft 38 which fits rotatably over shaft 28. Top 36 has an axially depending wall 40, also attached to shaft 38, which forms the adjustable wall of the dispensing compartment when the parts are assembled. A portion 42 of top 36 and a contiguous portion 44 of shaft 38 are of reduced axial height so that they will fit pivotably below extension 26 of member 18 when the parts are assembled. Portion 42 is provided with a depending wall 46 (partially shown in FIG. 2), also connected to shaft 38, which is immediately behind wall 30 at the maximum adjustable volume of the dispensing compartment formed by walls 30 and 40 permitted by ratchet teeth 32. Depending walls 45 and 47 add strength (see also FIG. 8).

Figure 9:
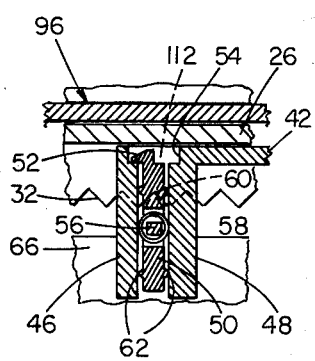
FIG. 9 is a vertical cross-section view on lines 9—9 of FIG. 7, looking in the direction of the arrows.

A wall 48 (partially shown in FIG. 2) depending from top portion 42, on the side of wall 46 away from wall 40, defines with wall 46, portion 42 and shaft 38 a slot open at its outer end and bottom which receives the shank of a dispensing compartment volume adjustment control pin designated generally 50. The shank of pin 50 is provided with a resilient, generally L-shaped lug 52 which can be forced through a slot 54 in portion 42 of top 36, parallel to the slot between walls 48 and 46, when the shank is inserted in the latter slot which it is sized to fit. Lug 52 fits slidably over the edge of slot 54 when inserted therethrough to hold the pin 50 assembled (see FIG. 9). The shank of pin 50 also has a central end cavity with a rod 56 porjecting from the base thereof which receives one end of a coil spring 58 which is compressed against shaft 38 when the pin is in operative position. The shank of pin 50 is also provided at its front with a double stepped portion the outer end of which is provided with a tooth or pawl 60 cooperating with ratchet teeth 32 when the parts are assembled (see FIG. 7), and with longitudinal resilient ribs 62 which facilitate sliding of the shank between walls 46 and 48.

The pivotable closure member operating assembly for alternately closing and opening the ends of the dispensing compartment for filling and dispensing comprises a member designated generally 64 with a hollow cylindrical wall 66 with diameter such as to fit rotatably over portion 24 of member 18. Wall 66 has secured to the inner periphery thereof a disc-like barrier member 68 which closes the axial opening through wall 66 except for a cut-away portion forming an opening 70 which, at one position of member 64, functions as a dispensing outlet from the dispensing compartment. Outwardly of member 68, wall 66 is provided with inwardly projecting resilient lugs 72 designed to snap-fit into slots 74 in an annular reduced end portion 76, having a diameter to fit closely within the adjacent end of wall 66, of a discharge spout 78, having an outlet opening 80 therefrom.

Fixed to the opposite side of member 64 from spout 78 is an axial stub shaft 82 having a diameter to fit snugly but rotatably the internal bore of shaft 38 of member 34. The portion of wall 66 which fits over portion 24 of member 18 has a cut-away arcuate portion with ends 84, 86 spaced apart less than 180°, preferably 140° to 150° about the axis of shaft 82. This cut-away portion permits adjustment movement of pin 50, and its ends 84, 86 act as pivot motion stops for member 64, as hereinafter described.

A reduced portion 88 at the free end of shaft 82 has a pair of opposite ribs 90 providing a configuration which nonrotatably fits a central aperture 92, and opposed small holes 94 on and extending through the rim thereof, provided in the other barrier member designated generally 96. Member 96 is generally disc-shaped and has a diameter small enough to fit closely, rotatably within a reduced diameter portion 98 in the inner surface of portion 20 of member 18, adjacent the inner end of screw thread 22. Member 96 has a segment cut away to form an inlet opening 100 from container 10 into the dispensing compartment.

Members 64 and 96 are assembled by inserting shaft 82 through hollow shaft 28 of member 18 (after member 34 has been assembled over shaft 28) until portion 88 projects beyond the end of shaft 28. Aperture 92 and holes 94 of member 96 are fitted over the ends of portion 88 and ribs 90, and the stem of a pin 102 is inserted in a central bore 104 in portion 88 of shaft 82 until a resilient circular rib 106 on the stem snaps into a corresponding groove 108 in the inner periphery of bore 104, releasably locking the members 64 and 96 together, with the head of pin 102 seated on the outer surface of member 96.

In assembling the complete closure member assembly 16, pin 50 is assembled to member 34 in the manner previously described and member 34 is assembled to member 18 by sliding hollow shaft 38 over shaft 28, with wall 46 located behind wall 30 (in FIG. 2). Member 34 is positioned so that the ledge 42' between it and top 36 lies axially behind (in FIG. 2) projection 26, so that top 36 and projection 36 are flush. Ledge 42' engages or is close to the adjacent edge of projection 26 at maximum capacity adjustment of dispensing compartment wall 40. Shaft 82 of member 64 is then inserted through hollow shaft 28 with the cut-away between ends 84, 86 receiving pin 50, member 96 is assembled to extension 88 and pin 102 is applied to hold members 18, 34, 64 and 96 together. Attachment of spout 78 completes the closure member assembly.

The parts are so proportioned that when the closure member 16 is attached to container 10 by screwing thread 22 into threads 14, the top 36 of member 34 lies at the base of reduced diameter portion 98 of member 18 in which barrier member 96 rotates with close clearance. Member 96 and top 36, together with extension 26 of member 18, close the container except when inlet opening 100 of member 96 is pivoted to overlie the dispense compartment between fixed wall 30 and movable wall 40, the fill position of member 96. Member 96 is provided with a pair of upstanding lugs 110 to stir the material immediately above it as it is pivoted, thereby preventing caking and is dished upwardly toward its center to reduce friction with top member 36.

Figure 6:
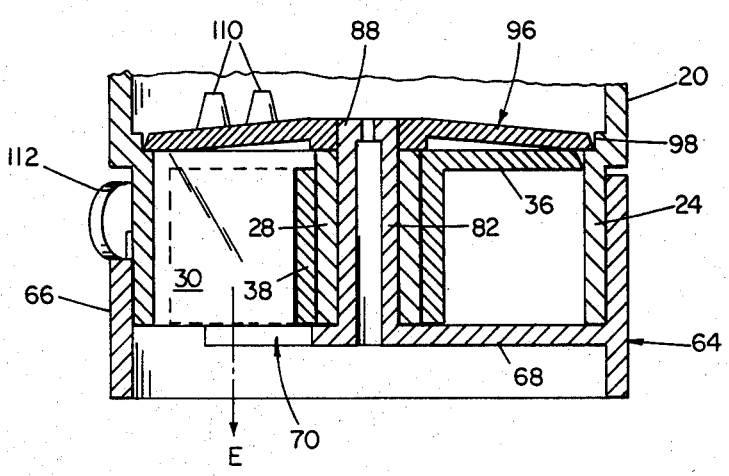
FIG. 6 is a vertical cross-section view of the parts shown in FIG. 5 assembled.
Figure 7:
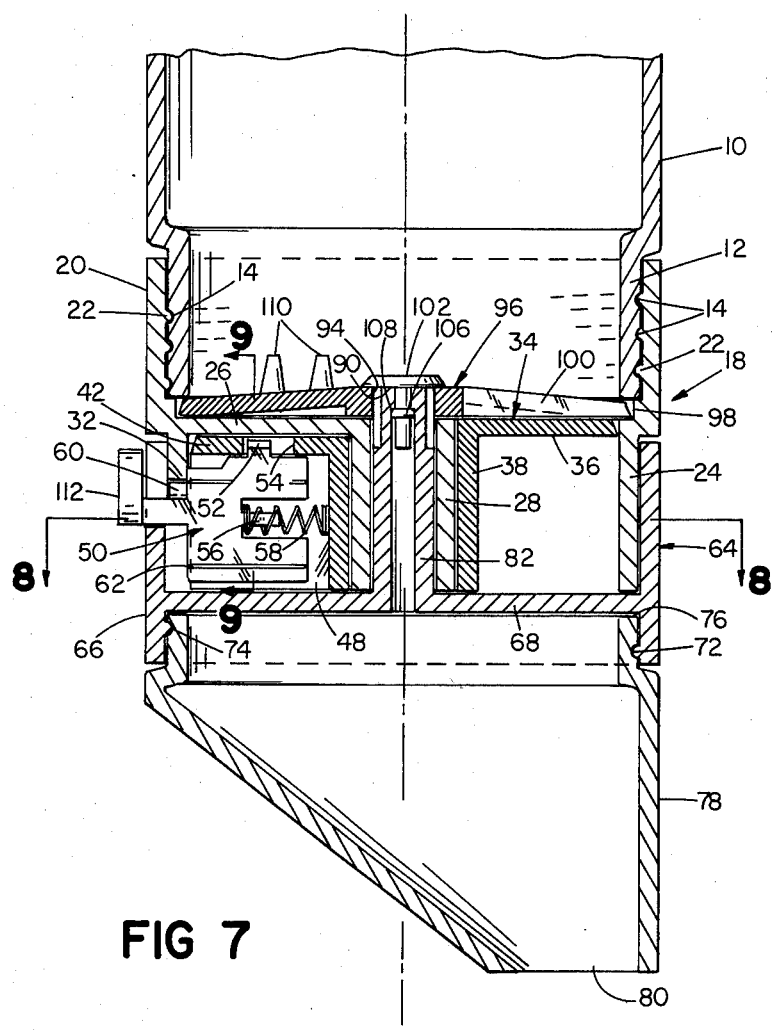

In use, the volume or capacity of the dispensing compartment is adjusted as desired by pushing pin 50 inwardly from its latched position of FIG. 7 by means of a button 112 on the end thereof, lug 52 sliding in slot 54 until pawl tooth 60 clears the inside of ratchet teeth 32. Member 34 can now be pivoted by means of pin 50 and button 112 to move wall 40 of member 34 toward or away from fixed wall 30 of member 18 the required amount, as indicated by a pointer 114 on button 112 cooperating with a scale 116 on wall portion 20 (FIGS. 1 and 1a), scale 116 being normally graduated in fractions and multiples of a teaspoon and/or tablespoon. The pressure on button 112 is then released so that pawl 60 engages the corresponding space between ratchet teeth 32. FIGS. 3 and 4 show the parts related in maximum capacity adjustment of the dispensing compartment while FIGS. 5-8 show an intermediate adjustment between maximum and minimum.

Next, the barrier members are operated between fill and dispense positions by pivoting (partially rotating) wall 66 of member 64 about its axis. If these members have not been left in the fill position, they are rotated clockwise in FIGS. 2-7 to pivot member 96 to the fill position shown in FIGS. 3 and 4, wherein engagement of end 86 of the cut-away in wall 66 engages pin 50 to stop further pivoting of member 64 with inlet opening 100 of member 96 in registry with the adjusted contiguous end of the dispensing compartment. In the fill position of FIGS. 3 and 4, the right-hand edge of opening 100 in these Figures is approximately flush with the inner surface of adjustable wall 40 of the dispensing compartment at all adjusted positions of wall 40. Its left-hand edge is approximately flush with the inner surface of the fixed wall 30 of the dispensing compartment when wall 40 is at maximum capacity adjustment as in FIGS. 3 and 4, and extends proportionally over, and is closed by, extension 26 at lower capacity adjustment of wall 40 toward wall 30, as in FIGS. 5 and 6, since pin 50 has been moved clockwise from its adjusted position in FIGS. 3 and 4.

To effect the fill and dispense operations, the container 10 is grasped in one hand and inverted from its FIG. 1 position to its position in the other Figures, and wall 66 is grasped in the other hand to pivot it about its axis. Pivoting of member 96 thereby to fill position may be effected with the device either upright or inverted. With the device inverted and member 64 adjusted to fill position of member 96, the dispensing compartment fills by gravity with material from the container, since its end adjacent the container is open thereto through opening 100 while its other end is closed by barrier member 68 as shown in FIGS. 3 and 4, outlet opening 70 in barrier member 68 having been moved correspondingly angularly away from the dispensing compartment as opening 100 in barrier member 96 is pivoted into registry therewith and before opening 100 reaches the inner side of wall 40.

Figure 5:
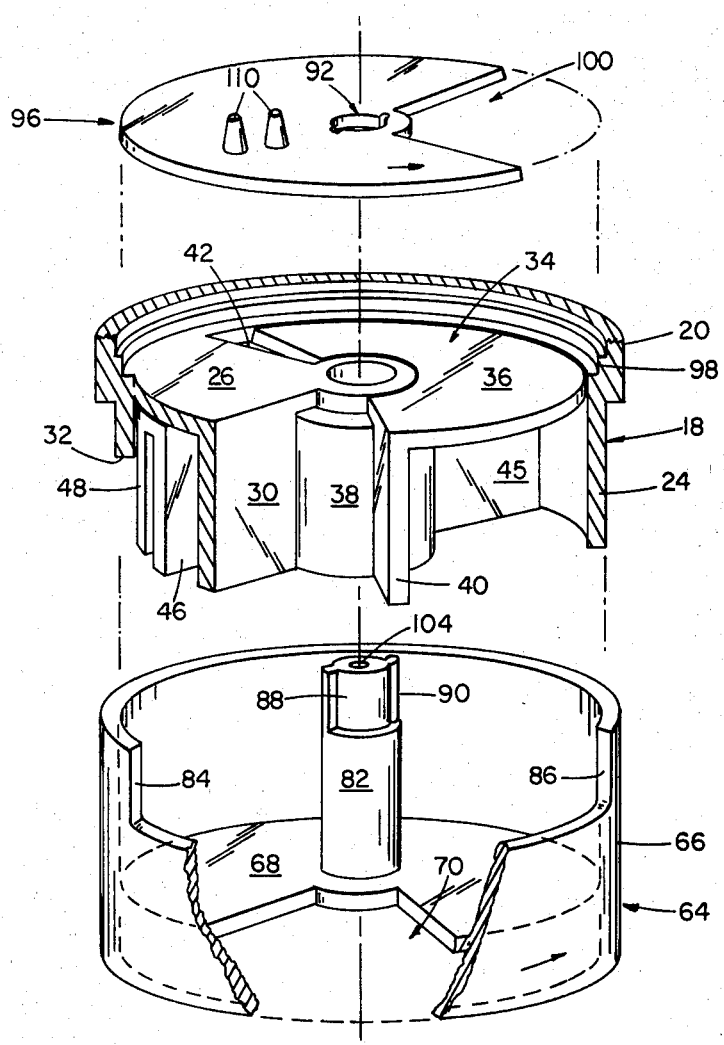
FIG. 5 is a view similar to FIG. 3 of the parts shown therein in a different relative position.

After the dispensing compartment is filled, which takes but a moment, wall 66 of member 64 is pivoted in the opposite direction, counterclockwise in FIGS. 3-6, from the fill position of FIGS. 3 and 4 to the dispense position of FIGS. 5 and 6, the device being held with spout 78 over the container into which the measured quantity of material is to be discharged, and being held inverted and operated by relative twist of the hands, which, with less than 180° angular pivot motion required, is a relatively simple, single-twist motion. By this motion slot 100 of member 96 is moved angularly away from the container end of the dispensing compartment beyond the inner face of wall 40, so that the dispensing compartment is closed to the container before the right-hand edge of opening 70 in member 68 reaches the inner side of wall 30. The fixed angular relation of openings 100 and 70 which causes members 68 and 96 to open their respective ends of the dispensing compartment only after the other member has closed its end thereof is determined by the angular positions of ribs 90 on shaft extension 88 of member 64 with reference to opening 70 of member 68 and of mating holes 92 in member 96 with reference to opening 100 of member 96.

In the dispense position of FIGS. 5 and 6, the right-hand edge of opening 70 of member 68 is approximately flush with or slightly beyond the inner face of wall 40, while its opposite edge underlies extension 26, its angular position with respect to extension 26 depending on the adjusted angular position of pin 50 in ratchet teeth 32, as pin 50 stops pivoting to dispense position by engaging end 84 of the cut-away in wall 66 of member 64.

Figure 8:
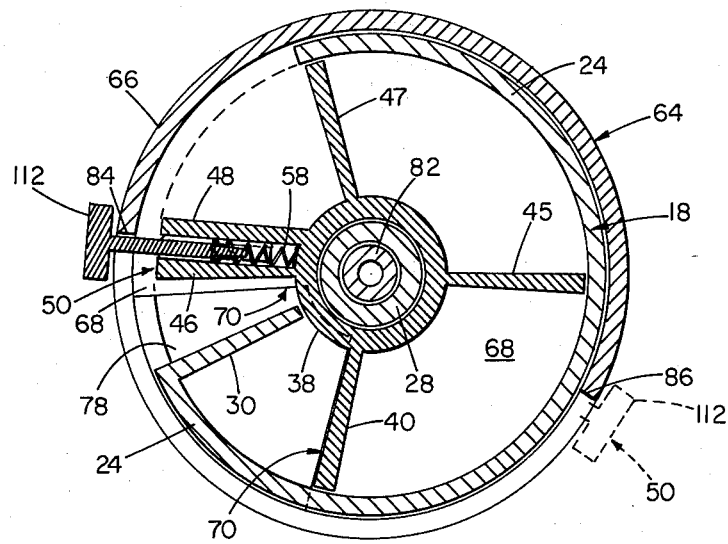
FIG. 8 is a transverse cross-section view on line 8—8 of FIG. 7, looking in the direction of the arrows.

FIG. 8 also shows the parts in their positions of FIGS. 5 and 6. It will be seen that end 84 has engaged pin 50 to stop pivoting of member 64 counterclockwise with opening 70, indicated by dotted lines, having its right-hand edge below wall 40 and its left-hand edge spaced from wall 30, by virtue of the adjusted position of pin 50 for less than maximum capacity of the dispensing compartment. The compartment bottom is however fully exposed. The fill position of member 64 is indicated by the dash line showing of pin 50 engaging the opposite end stop 86 in wall 66 of member 64.

The parts are so designed that they may be molded from plastic, as is preferred. The closure member assembly is easy to operate, both for fill-dispense and dispensed volume adjustment, and is readily assembled and disassembled.

I claim:

1. A closure member for attachment to an outlet from a container of granulated material for providing dispensing of the contents thereof in successive increments of variable volume, said closure member comprising:

a support member arranged to be attached to said container outlet and having a generally hollow interior with means for supporting axially therein a hollow shaft;

variable capacity dispensing means having an inlet end arranged for exposure to said container outlet, and an opposite outlet end;

operating means for said dispensing means accessible from the exterior of said closure member and oppositely pivotable about an axis to alternately close said outlet end and thereafter open said inlet end to said compartment, and to close said inlet end and thereafter open said outlet end, said operating means including a pair of barrier members respectively associated with said opposite ends of said dispensing means and operable to effect the closing and opening of the ends thereof;

said barrier member associated with said outlet end of said dispensing means having an axial shaft adapted to be projected coaxially through and beyond said shaft of said support member toward the container end thereof, and being secured in a generally hollow operating member forming part of the exterior of said closure member;

the other said barrier member being provided with means for attachment thereof to the end of said barrier member shaft projected through and beyond said support member shaft for demountably rotatably mounting said barrier members to said support member shaft;

each of said barrier members being provided with an opening therethrough spaced angularly about the axis of said shafts so that on oppositely pivoting said barrier members about said axis by said operating member said openings are brought into alternate registry with said opposite ends of said dispensing means; and adjustment means accessible from the exterior of said closure member for adjustably varying the capacity of said dispensing means, said adjustment means including:

a fixed side wall of a dispensing compartment mounted in said support member so that said side wall extends axially thereof;

an adjustment member carrying an opposite side wall for said compartment having an interior hollow support shaft fitting coaxially over said shaft of said support member to mount said adjustment member rotatably thereon within said hollow operating member for pivoting the compartment side wall carried thereby toward and away from the compartment fixed side wall to vary the capacity of the compartment;

ratchet and pawl means connected between said support member and said adjustment member providing incremental adjustment pivotal movements of said adjustment member; and scale means cooperating with said ratchet and pawl means for indicating the different capacities of said compartment at the incremental adjustments provided by said ratchet and pawl means.

2. A closure member for attachment to an outlet from a container of granulated material for providing dispensing of the contents thereof in successive increments of variable volume, said closure member comprising:

a support member arranged to be attached to said container outlet;

variable capacity dispensing means having an inlet end arranged for exposure to said container outlet, and an opposite outlet end;

operating means for said dispensing means accessible from the exterior of said closure member and oppositely pivotable about an axis to alternately close said outlet end and thereafter open said inlet end to said container for filling, and to close said inlet end and thereafter open said outlet end for dispensing, said operating means including a pair of barrier members respectively associated with said opposite ends of said dispensing means and operable to effect the closing and opening of the ends thereof;

said barrier member associated with said outlet end of said dispensing means being secured to an operating member of said operating means;

attachment means rotatably attaching said barrier members to said support member for opposite pivoting about an axis and coupling said barrier members and operating member together in fixed angular and axial relation to each other and in fixed axial relation to said support member for pivoting in unison by rotation of said operating member, said operating member being formed to present to the exterior of said closure member an operating portion substantially surrounding said axis of a size suitable for grasping in a hand;

each of said barrier members being provided with an opening therethrough spaced angularly about said axis so that on oppositely pivoting said barrier members about said axis by rotation of said operating member said openings are brought into alternate registry with said opposite ends of said dispensing means; and adjustment means accessible from the exterior of said closure member for adjustably varying the capacity of said dispensing means.

3. A closure member according to claim 2 wherein said attachment means includes shafts fixed axially to said support member and said operating member respectively, one of said shafts being hollow and sized to receive the other said shaft rotatably therein, and means for detachably coupling said shafts relatively rotatably together in fixed axial relation.

4. A closure member according to claim 2 wherein said operating member includes a discharge spout.

5. A closure member according to claim 4 wherein said spout has a frusto-conical discharge end with an outlet opening therein at one side of the longitudinal axis of the closure member.

6. A closure member according to claim 2 wherein said support member has a cylindrical open end remote from said container, and said operating member has a cylindrical outer wall fitting rotatably over said end of said support member and forming said operating portion thereof.

7. A closure member according to claim 2 which includes means cooperating with said adjustment means for visually indicating the adjusted capacity of said dispensing means.

8. A closure member according to claim 2 wherein said axis is the longitudinal axis of said closure member and said operating means is oppositely pivotable about said axis less than 180° to fill and dispense said dispensing means.

9. A closure member according to claim 8 wherein said axis is the longitudinal axis of the container, and said closure member is rendered operative for dispensing by inverting said container and closure member attached thereto.

10. A closure member according to claim 2 wherein said dispensing means comprises a single, variable capacity dispensing compartment.

11. A closure member according to claim 3 wherein said adjustment means includes:
a fixed side wall of a dispensing compartment mounted in said support member so that said side wall extends axially thereof;
an adjustment member carrying an opposite side wall for said compartment having an interior hollow support shaft fitting coaxially over said hollow shaft to mount said adjustment member rotatably thereon for pivoting the compartment side wall carried thereby toward and away from the compartment fixed side wall to vary the capacity of the compartment;
ratchet and pawl means connected between said support member and said adjustment member providing incremental adjustment pivotal movements of said adjustment member; and
scale means cooperating with said ratchet and pawl means for indicating the different capacities of said compartment at the incremental adjustments provided by said ratchet and pawl means.

* * * * *